June 13, 1950 W. G. H. FINCH ET AL 2,511,704

FACSIMILE RECEIVER HELICAL DRUM ASSEMBLY

Filed Dec. 17, 1946

INVENTORS
William G. H. Finch
Gottfried H. Hohmann
BY Ostrolenk & Faber
ATTORNEYS Patented June 13, 1950 2,511,704

UNITED STATES PATENT OFFICE 2,511,704

FACSIMILE RECEIVER-HELICAL DRUM ASSEMBLY

William G. H. Finch, Newton, Conn., and Gottfried H. Hohmann, Bronx, N. Y., assignors, by mesne assignments, to Pierce Company, Providence, R. I.

Application December 17, 1946, Serial No. 716,773

3 Claims. (Cl. 346—101)

Our present invention relates to facsimile recorders and more particularly to facsimile recorders of the type wherein a helical wire on a revolving drum co-acts with a blade to mark a sheet of chemically treated paper passing between the drum and the blade.

The type of facsimile recorder herein contemplated is of the general character shown in Patent No. 2,413,962.

Essentially, our invention contemplates the utilization of a removable wire as the helix on the drum, the said wire being positioned by a groove in the drum and being tensioned by appropriate simplified tensioning means.

Our invention also contemplates the utilization of such a removable wire together with mounting means so arranged that the wire may be placed on the drum and removed therefrom without the necessity for removing the drum from the facsimile recorder and without the necessity for complex manipulations. Thus, the primary object of our invention is the provision of a novel facsimile recorder having a removable wire as the helical scanner on the drum.

Another object of our invention is the provision of novel tensioning and mounting means for the removable wire on the drum so that the wire may be replaced readily.

The foregoing and many other objects of our invention will become apparent in the following descriptions and drawings in which Figure 1 is a view in elevation of our novel facsimile drum carrying the novel wire supporting and tensioning means of our invention.

Figure 1:
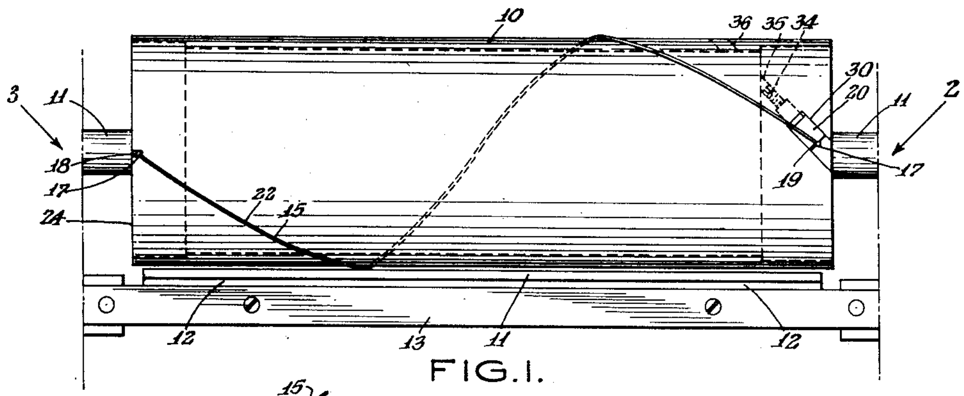
Figure 2:
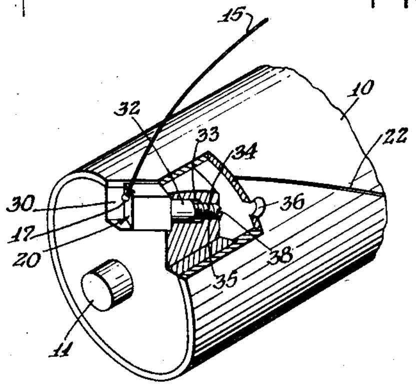
Figure 2 is a view taken from side 2 of Figure 1 showing the method by which one end of the wire is mounted on the drum and showing also the novel tensioning means therefor.
Figure 3:
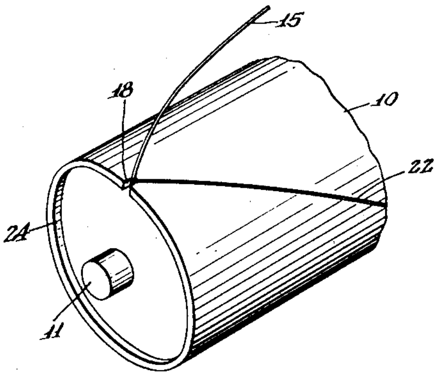
Figure 3 is a view taken from side 3 of the drum of Figure 1 showing the means for mounting the opposite end of the wire on the drum.
Figure 5:
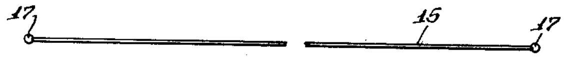
Figure 5 is a view of the wire.
Figure 4:
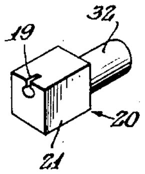
Figure 4 is a view in perspective of a portion of our novel tensioning means.

Referring now to the figures, the facsimile drum 10 is mounted on shaft 11, which is rotated in any suitable manner in order to provide a scanning of the facsimile record sheet in accordance with the principle set forth in Patent No. 2,413,962.

The paper on which a record is to be made travels between the drum 10 and the knife blade 11 spring biased toward the drum 10 by springs (not shown), but mounted at 12 on the knife blade support 13.

The helical recording wire 15 on the drum 10 has a 360° turn thereon in order to provide for a helical scanning of the record sheet in accordance with well-known principles relating to helical scanning devices. The wire 15 is a removable wire which is preferably round.

The wire 15 is provided with enlarged lugs, nodes or knobs 17 at either end in order to engage slot 18 on one side of the drum and slot 19 in the tensioning device 20 on the other side of the drum.

The drum 10 is provided with a helical groove 22 extending from the end to the other side of the drum and making a 360° turn, the said groove 22 being machined in the drum and providing an absolutely accurate track or support for the wire 15. When the wire 15 is mounted on the drum and appropriately tensioned with respect thereto, it rests in the groove 22 projecting therefrom sufficiently to provide the helical recording scanner, but being firmly held in position by the cooperation of the groove 22 with the tensioning means.

The surface of drum 10 is extended at 24 to form the annular flange which is provided with the notch 18 in which is caught one of the knobs 17 of the wire 15. After the knob 17 of wire 15 is caught in the notch 18, the drum 10 is rotated one revolution, while the wire 15 is carefully laid in the groove 22 during this rotation. The opposite knob 17 of the wire 15 is then caught in the notch 19 of the tensioning member 20 at the opposite end of the drum.

The tensioning member 20 is then tightened so that the wire 15 is extended in the groove 22 and pulled up toward it. The tensioning member 20 comprises the block-like element 21 mounted in the slide 30 of the drum, the said slide 30 being arranged so that it is directed substantially circumferentially of the drum and at an angle so that its main axis is aligned with the axis of the bead or wire 15 at the end 2 of the drum.

The block 20 is thus prevented from rotation because it matches exactly the squared slide 30 in the drum but may move back and forth therein. Block 20 is provided with the substantially cylindrical extension 32 having a tapped end 33 in which the screw 34 may be threaded.

Screw 34 is threaded into the opening 35 of the drum, which opening is tapped, the said opening communicating through the hole 36 with the outside of the drum. Screw 34 may have a slotted head 38 as shown or may have a hexagonal or square socket so that it may be manipulated by either a screw driver or a socket wrench introduced through the hole 36.

When the screw 34 is thus rotated, it causes the cylindrical extension 32 of block 21 and the block 21 of the tensioning device 20 to move in or out in accordance with the direction of rotation of screw 34. Thus, the block 21 may be pushed down away from the end 36 of the opening 35 and toward the outer end or side 3 of the drum 10 to tension the wire 15 and thus create a helical scanner.

When the wire 15 has worn down so that it is no longer efficient for recording purposes, then it is only necessary to insert the screw driver or socket wrench into the opening 36 to rotate the screw 34 sufficiently to release the tension on the block 21 and thus permit the wire 15 to be removed.

The replacement wire is then mounted in slot 18 and the opposite end is caught in slot 19 of block 21 after the wire has been wrapped around the drum 10 and positioned in the groove 22. The socket wrench or screw driver is then used to rotate the screw 34 to appropriately tension the wire 15 to create the helical bead.

By this means, therefore, a simplified means is provided for mounting a helical scanner on the drum and for removing the same while the drum is in position without requiring removal of the drum for this purpose. It is only necessary in removing the wire 15 to rotate the drum to a position where the hole 36 is at the front of the mechanism so that a screw driver or socket wrench may be inserted through the hole 36 to loosen the block 21.

The end of the wire is then removed from notch 19 and the wire is slipped off the drum 10, the opposite end being then slipped out of notch 18. It will be seen that this can readily be done since both the notches 18 and 19 are on the same side of the drum. The replacement wire is then mounted at one end in notch 18 and the drum is rotated slowly by hand for one revolution as the wire 15 is laid down in the groove 22.

On the completion of this one revolution, the opposite end of the wire is caught in the notch 19 of the tensioning device 20. The screw driver or socket wrench inserted through the opening 35 then tightens the tensioning device 20 to secure the wire in place.

In the foregoing, we have described our invention only in connection with a specific preferred embodiment thereof. Many variations and modifications of my invention should now be obvious to those skilled in the art. Accordingly, we prefer to be bound not by the specific disclosure herein contained, but only by the appended claims.

We claim:

1. In a facsimile recorder, a drum, a single turn helical groove in the surface of said drum, a wire positioned in said groove, said wire having a knob at each end, a notch at one end of said drum engaging and holding the knob at one end of said wire and an adjustable tensioning member at the other end of said drum, said member having a notch engaging the knob at the other end of the wire.

2. In a facsimile recorder, a drum, a single turn helical groove in the surface of said drum, a wire positioned in said groove, said wire having a knob at each end, a notch at one end of said drum engaging and holding the knob at one end of said wire and an adjustable tensioning member at the other end of said drum, said member having a notch engaging the knob at the other end of the wire, an additional groove in said drum, said tensioning member being slidable in said additional groove.

3. In a facsimile recorder, a drum, a single turn helical groove in the surface of said drum, a wire positioned in said groove, said wire having a knob at each end, a notch at one end of said drum engaging and holding the knob at one end of said wire and an adjustable tensioning member at the other end of said drum, said member having a notch engaging the knob at the other end of the wire, an additional groove in said drum, said tensioning member being slidable in said additional groove and threaded operating means engaging said tensioning member for moving said tensioning member in said groove and locking the same in adjusted position.

WILLIAM G. H. FINCH.
GOTTFRIED H. HOHMANN.

REFERENCES CITED

The following references are of record in the file of this patent:

UNITED STATES PATENTS

| Number | Name | Date |
|---|---|---|
| 1,697,932 | Schnitzeler et al. | Jan. 8, 1929 |
| 1,848,862 | Young | Mar. 8, 1932 |
| 2,104,109 | Young | Jan. 4, 1938 |